(12) United States Patent
Ziegan

(10) Patent No.: US 10,407,840 B2
(45) Date of Patent: Sep. 10, 2019

(54) SURFACE SYSTEM AND METHOD OF INSTALLATION

(71) Applicant: Robert Ziegan, Bay Village, OH (US)

(72) Inventor: Robert Ziegan, Bay Village, OH (US)

( * ) Notice: Subject to any disclaimer, the term of this patent is extended or adjusted under 35 U.S.C. 154(b) by 0 days.

(21) Appl. No.: 15/981,870

(22) Filed: May 16, 2018

(65) Prior Publication Data

US 2018/0371706 A1    Dec. 27, 2018

Related U.S. Application Data

(60) Provisional application No. 62/506,832, filed on May 16, 2017.

(51) Int. Cl.
| | | |
|---|---|---|
| *E01C 13/08* | (2006.01) | |
| *E01C 13/02* | (2006.01) | |
| *E01C 23/01* | (2006.01) | |
| *A63B 69/36* | (2006.01) | |
| *E01C 11/22* | (2006.01) | |
| *A01G 9/28* | (2018.01) | |

(52) U.S. Cl.
CPC .............. *E01C 13/08* (2013.01); *A01G 9/28* (2018.02); *A63B 69/3691* (2013.01); *E01C 11/221* (2013.01); *E01C 13/02* (2013.01); *E01C 23/01* (2013.01)

(58) Field of Classification Search
CPC .............. A63B 69/36; A63B 69/3691; A01G 13/0293; E01C 13/00; E01C 13/08
USPC ..... 405/16, 17, 302.4, 302.6, 302.7; 472/92; 47/33; 473/171; 52/102
See application file for complete search history.

(56) References Cited

U.S. PATENT DOCUMENTS

| | | | |
|---|---|---|---|
| 3,797,049 A * | 3/1974 | De Santo | E04H 4/0018 220/495.01 |
| 4,007,307 A | 2/1977 | Friedrich | |
| 4,008,548 A * | 2/1977 | Leclerc | E01C 13/045 428/131 |
| 4,012,545 A | 3/1977 | Toland | |
| D244,460 S | 5/1977 | Jenkins | |
| 4,181,450 A | 1/1980 | Rasen et al. | |
| 4,443,575 A | 4/1984 | Iwni et al. | |
| 4,611,809 A | 9/1986 | Gettelfinger | |
| 4,662,184 A | 5/1987 | Pohl et al. | |
| 4,765,775 A * | 8/1988 | Kroger | B65D 90/24 405/129.8 |
| 4,790,538 A | 10/1988 | Gettelfinger | |
| 4,902,540 A | 2/1990 | Murrino | |
| 4,913,596 A | 4/1990 | Lambert, III | |
| 4,969,289 A * | 11/1990 | Trifiletti | A01G 9/28 47/33 |
| 5,092,076 A * | 3/1992 | Terreta | A01G 9/28 47/33 |
| D339,199 S | 9/1993 | Rynberk | |

(Continued)

*Primary Examiner* — Frederick L Lagman
(74) *Attorney, Agent, or Firm* — Curatolo Sidoti Co., LPA; Salvatore A. Sidoti

(57) ABSTRACT

Provided is a surfacing system, such as an artificial turf system. The surfacing system includes a base member formed from a plurality of interconnected tile members. The base member is configured to accept a suitable amount of infill material. A covering layer such as an artificial turf layer is applied over the infilled base member and secured to a flexible outer border member. Also provided is a method of installing the surfacing system.

19 Claims, 5 Drawing Sheets

(56) References Cited

U.S. PATENT DOCUMENTS

| | | | |
|---|---|---|---|
| 5,356,344 A | 10/1994 | Lemieux | |
| 5,377,447 A * | 1/1995 | Fritch | A01G 9/28 47/33 |
| 5,379,546 A * | 1/1995 | Popp | A01G 9/28 47/33 |
| 5,454,195 A * | 10/1995 | Hallsten | B65D 90/24 220/495.01 |
| D364,233 S | 11/1995 | Caley | |
| D384,234 S | 11/1995 | Caley | |
| 5,489,317 A | 2/1996 | Gergevin | |
| D368,969 S | 4/1996 | Davies | |
| D372,539 S | 8/1996 | Davies | |
| D373,205 S | 8/1996 | Caley | |
| 5,580,320 A | 12/1996 | Meikle | |
| 5,830,080 A | 11/1998 | Reynolds | |
| 5,882,142 A * | 3/1999 | Siglin | E02D 29/14 405/52 |
| D409,457 S | 5/1999 | Tisbo | |
| 5,930,947 A * | 8/1999 | Eckhoff | E02D 29/0225 47/33 |
| 5,945,870 A | 9/1999 | Bifano | |
| 5,947,829 A | 9/1999 | Grimes, Jr. | |
| 5,970,671 A | 10/1999 | Bifano | |
| 6,070,374 A | 6/2000 | Bifano | |
| 6,071,038 A * | 6/2000 | Strobl, Jr. | E01C 11/221 404/7 |
| 6,112,680 A | 9/2000 | Hummer | |
| 6,139,443 A | 10/2000 | Reynolds | |
| 6,221,445 B1 | 4/2001 | Jones | |
| 6,230,451 B1 * | 5/2001 | Stoller | A63C 19/10 220/9.4 |
| 6,263,616 B1 | 7/2001 | Hummer | |
| 6,616,542 B1 * | 9/2003 | Reddick | A63B 69/3661 428/17 |
| 6,695,534 B2 * | 2/2004 | Cain | B65D 90/24 405/114 |
| 6,698,141 B2 | 3/2004 | Silberman et al. | |
| 6,767,159 B2 * | 7/2004 | Jones | A01G 9/28 404/7 |
| 6,794,007 B2 | 9/2004 | Carr et al. | |
| 6,818,274 B1 | 11/2004 | Buck et al. | |
| 6,823,636 B2 | 11/2004 | Mahoney | |
| 6,877,932 B2 | 4/2005 | Prevost | |
| 7,081,283 B2 | 7/2006 | Straughn | |
| 7,144,609 B2 | 12/2006 | Reddick | |
| 7,166,340 B1 | 1/2007 | Clark | |
| 7,171,780 B1 | 2/2007 | Hudson | |
| 7,175,362 B2 | 2/2007 | Carr et al. | |
| 7,273,542 B2 | 9/2007 | Prevost | |
| 7,290,958 B2 | 11/2007 | Blackwood | |
| 7,300,689 B2 | 11/2007 | Prevost | |
| 7,341,401 B2 | 3/2008 | Blackwood | |
| 7,607,265 B2 | 10/2009 | Curry et al. | |
| 7,614,825 B2 * | 11/2009 | Kroger | B65D 90/24 220/476 |
| 7,757,450 B2 | 7/2010 | Reyes | |
| 7,945,935 B2 | 5/2011 | Hooper | |
| 7,955,025 B2 | 6/2011 | Murphy et al. | |
| 8,147,347 B2 | 4/2012 | Hooper | |
| 8,266,857 B2 | 9/2012 | David | |
| 8,490,361 B2 | 7/2013 | Curry et al. | |
| 8,540,456 B2 * | 9/2013 | Marshall | B65D 90/24 405/107 |
| 8,568,852 B2 | 10/2013 | Smit et al. | |
| 8,702,345 B2 * | 4/2014 | Stein | B08B 17/025 405/107 |
| 8,967,906 B2 | 3/2015 | Sawyer | |
| 9,045,071 B2 | 5/2015 | Nicholls et al. | |
| 9,051,739 B2 | 6/2015 | Rosan | |
| 9,080,373 B2 | 7/2015 | Silk | |
| 9,157,196 B2 | 10/2015 | McSwain et al. | |
| 9,163,375 B2 | 10/2015 | Ayers et al. | |
| 9,168,442 B2 | 10/2015 | Covino | |
| D748,823 S | 2/2016 | Amrine | |
| 9,267,244 B2 | 2/2016 | Bennett et al. | |
| D751,225 S | 3/2016 | Rynberk | |
| 9,308,557 B2 | 4/2016 | Nicholls et al. | |
| 9,388,535 B2 | 7/2016 | Devries | |
| 9,394,651 B2 | 7/2016 | Sawyer | |
| 9,416,580 B2 | 8/2016 | Stevens | |
| 9,453,308 B2 | 9/2016 | Hardman | |
| D773,074 S | 11/2016 | Amrine | |
| 9,528,280 B2 | 12/2016 | Cormier et al. | |
| 9,587,364 B2 | 3/2017 | Ayers et al. | |
| 9,587,367 B2 | 3/2017 | Ayers et al. | |
| D792,609 S | 7/2017 | Smith | |
| D792,610 S | 7/2017 | Smith | |
| D800,344 S | 10/2017 | Apanovich | |
| D800,921 S | 10/2017 | Apanovich | |
| 9,790,647 B2 * | 10/2017 | Fellars | E01C 13/08 |
| 2003/0000135 A1 * | 1/2003 | Burnham | A01G 9/28 47/33 |
| 2003/0190192 A1 * | 10/2003 | Cain | B65D 90/24 405/52 |
| 2004/0058096 A1 | 3/2004 | Prevost | |
| 2008/0163566 A1 * | 7/2008 | Bella | A01G 9/28 52/102 |
| 2008/0235921 A1 * | 10/2008 | Zwier | A01G 9/28 24/545 |
| 2009/0038214 A1 * | 2/2009 | Rozen | A01G 9/28 47/33 |
| 2009/0208674 A1 * | 8/2009 | Murphy | E01C 13/08 428/17 |
| 2010/0050505 A1 * | 3/2010 | Zwier | A01G 9/28 47/33 |
| 2010/0058657 A1 * | 3/2010 | Fishburn | E04D 11/002 47/33 |
| 2013/0025194 A1 * | 1/2013 | Adam | A01G 9/28 47/33 |

\* cited by examiner

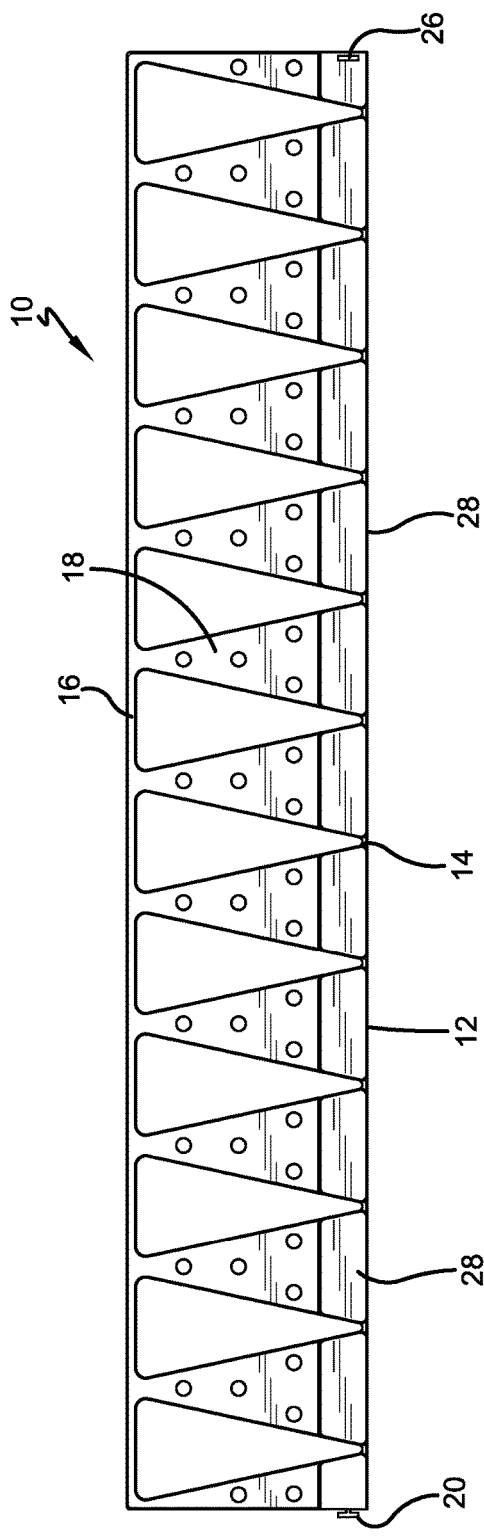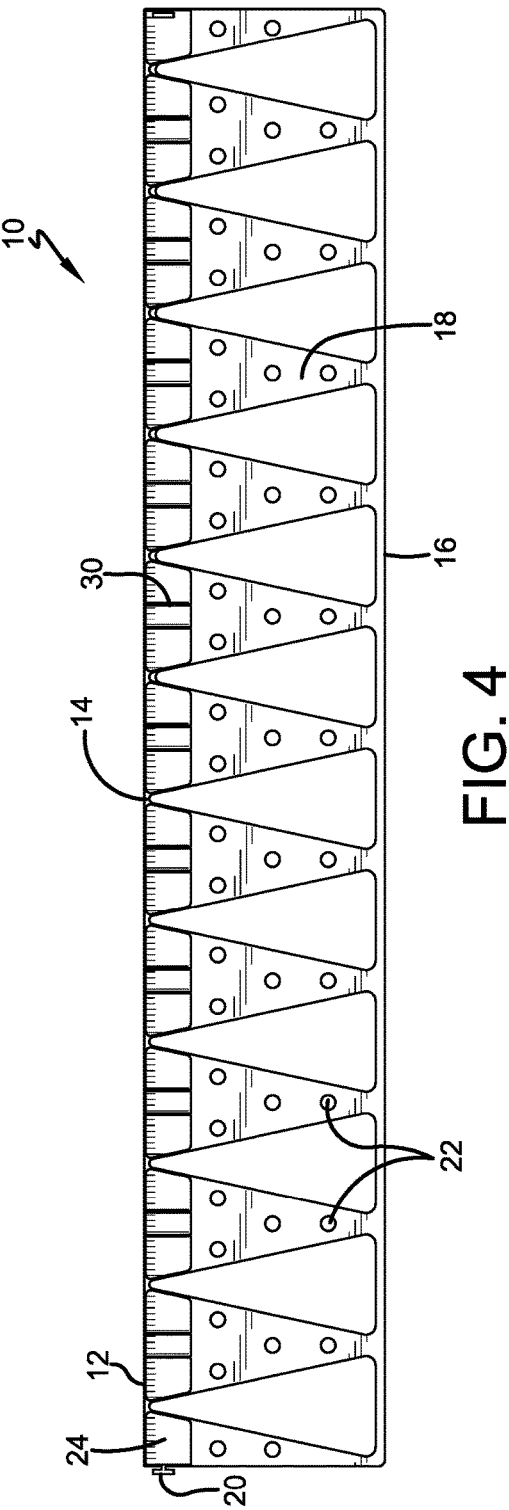

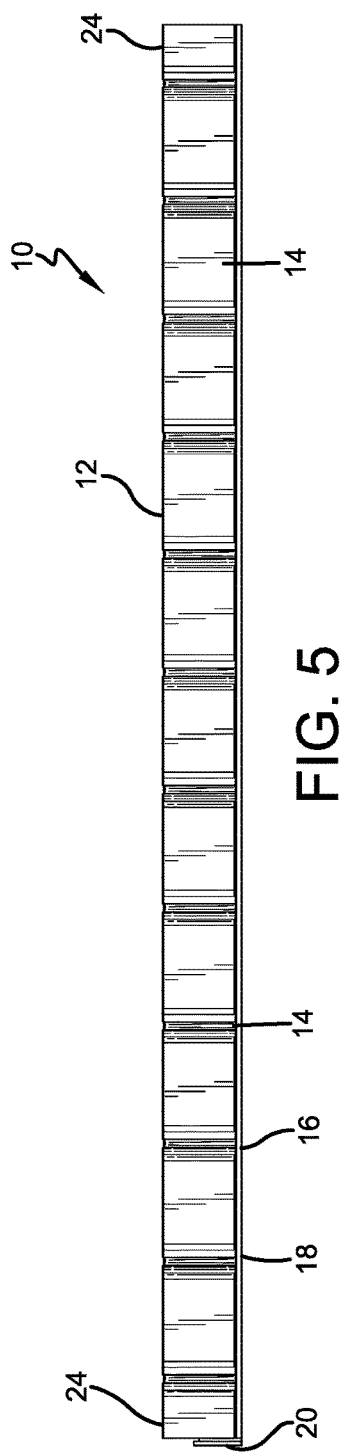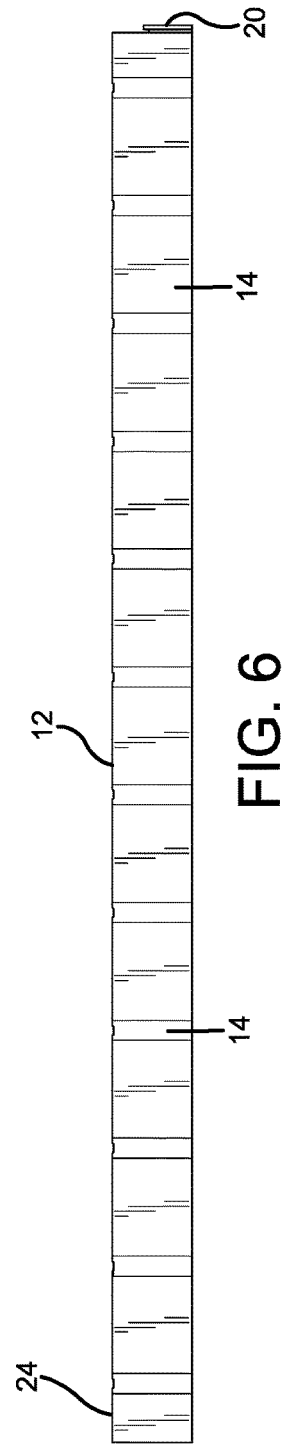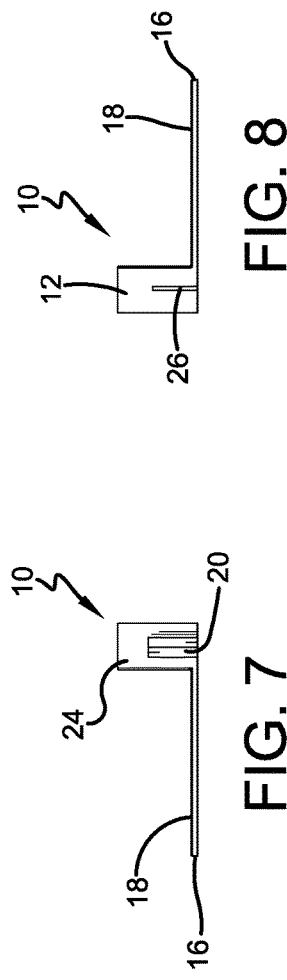

SURFACE SYSTEM AND METHOD OF INSTALLATION

CROSS REFERENCE TO RELATED APPLICATIONS

This application claims the benefit of the filing date under 35 U.S.C. 119(e) of U.S. Provisional Application for Patent Ser. No. 62/506,832 filed May 16, 2017, which is hereby incorporated by reference in its entirety.

TECHNICAL FIELD

This disclosure relates to a surfacing system and a method of installing the surfacing system.

BACKGROUND

Artificial turf surfaces are becoming increasingly popular as a replacement for natural grass in stadiums, on golf courses, playground areas, sports playing fields and residential lawns. Artificial turf surfaces require less maintenance than natural grass surfaces, and do not require water, chemicals, or sunlight to maintain the surface. The environmental impact of artificial turf surfaces is considered less than that of an equivalent natural grass surface, as water and/or chemicals are not used to maintain the surface, and fossil fuel consuming equipment is not needed to groom the surface.

An artificial turf surface system may include a border to establish a perimeter about the artificial turf surface. Rigid wood studs are typically inserted into the ground to establish a border about the perimeter of the artificial turf surface. The artificial turf is rolled over an underlying horizontal surface and is secured to the wood studs. There is a significant disadvantage of using wood stud to define a border. The wood studs are not flexible and therefore cannot accommodate curved or complex shaped regions of the perimeter of the artificial turf system.

What is needed in the art is a border that able to secure the covering layer of artificial turf against wind uplift and that can accommodate more challenging border geometries such as curved or rounded areas.

SUMMARY

Provided is a surface system comprising a flexible border comprising an upstanding edge portion having opposite first and second ends, a top surface capable of being penetrated by a mechanical fastener to secure a covering layer to said flexible border, and a flange portion extending substantially horizontally from said upstanding edge portion and configured to secure the flexible border to an underlying surface; a covering layer; and at least one fastener securing said covering layer to said flexible border.

According to certain embodiments, the surface system comprises a base; a top covering layer covering said base; and a flexible border surrounding said base comprising an upstanding edge portion having opposite first and second ends, a surface capable of being penetrated by a mechanical fastener to secure said top covering layer to said flexible border, and a flange portion extending substantially horizontally from said edge portion and configured to secure the flexible border to an underlying surface; and at least one fastener securing said top covering layer to said flexible border.

Additionally provided is a surface system comprising a base; an infill material positioned in said base; a top covering layer covering said base and a flexible border surrounding said base comprising an upstanding edge portion having opposite first and second ends, a surface capable of being penetrated by a mechanical fastener to secure said top covering layer to said flexible border, and a flange portion extending substantially horizontally from said edge portion and configured to secure the flexible border to an underlying surface; and at least one fastener securing said top covering layer to said flexible border.

Further provided is a method of installing a surfacing system comprising securing a flexible border to an underlying surface, said flexible border comprising an upstanding edge portion having opposite first and second ends, a surface capable of being penetrated by a mechanical fastener to secure a top covering layer to said flexible border, and a flange portion extending substantially horizontally from said edge portion and configured to secure the flexible border to an underlying surface, by passing a fastener through said flange portion of said flexible border and into said underlying surface, said secured flexible border defining a perimeter of said surfacing system; infilling an area within said perimeter with a suitable infill material; and applying a top covering layer over said infilled area and securing said top covering layer to said upstanding edge portion of said flexible border member.

According to certain embodiments, the method of installing a surfacing system comprises securing a flexible border to an underlying surface, said flexible border comprising an upstanding edge portion having opposite first and second ends, a surface capable of being penetrated by a mechanical fastener to secure a top covering layer to said flexible border, and a flange portion extending substantially horizontally from said edge portion and configured to secure the flexible border to an underlying surface, by passing a fastener through said flange portion of said flexible border and into said underlying surface, said secured flexible border defining a perimeter of said surfacing system; positioning a base member within said perimeter of said surfacing system; infilling said base member with a suitable infill material, and applying a top covering layer over said infilled base member and securing said top covering layer to said upstanding edge portion of said flexible border member.

BRIEF DESCRIPTION OF THE DRAWINGS

The accompanying drawings are included to provide a further understanding of the surfacing system and method disclosed herein, and are incorporated in and constitute a part of this specification. The figures illustrate certain embodiments of the system and method disclosed herein and, together with the description, serve to explain the principles described herein, but are not intended to limit the specification or any of the claims.

FIG. 3 is a top view of the border of the present embodiments.

FIG. 4 is a bottom view of the border of the present embodiments.

FIG. 5 is a front view of the border of the present embodiments.

FIG. 6 is a back view of the border of the present embodiments.

FIG. 7 is a right side view of the border of the present embodiments.

FIG. 8 is a left side view of the border of the present embodiments.

DETAILED DESCRIPTION

Figure 1:
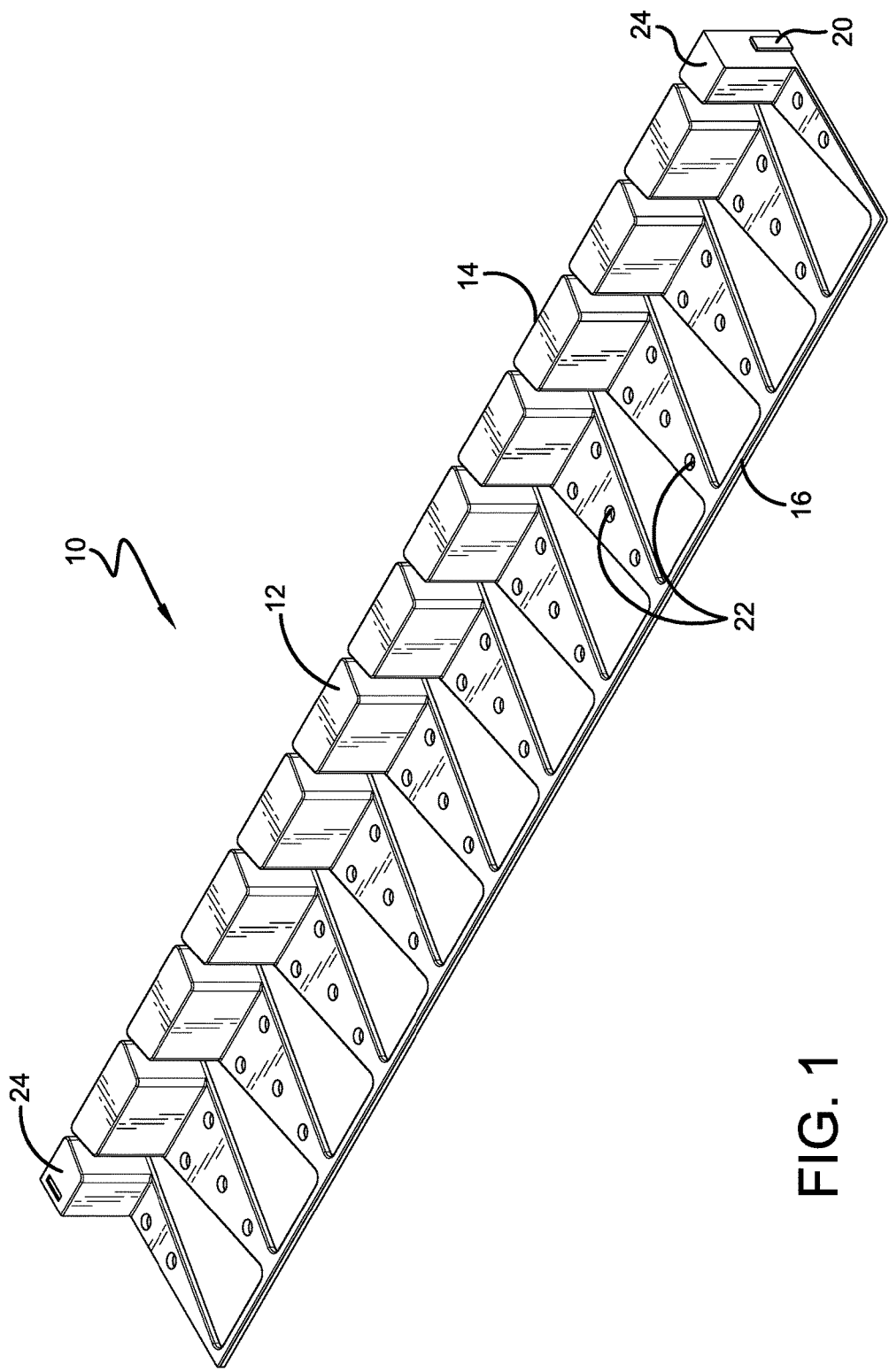
FIG. 1 is a perspective view of the border of the present embodiments.

Disclosed is a flexible border for a surfacing system such as an artificial turf system. The flexible border comprises an upstanding edge portion and a flange portion extending from a lower portion of the upstanding edge portion. The upstanding edge portion of the flexible border includes opposite first and second ends. The upstanding edge portion of the flexible border comprises a top surface, spaced-apart side walls that depend downwardly from opposite lateral edges of the top surface and, optionally, an open bottom. The top surface of the upstanding edge portion of the flexible border is capable of being penetrated by a mechanical fastener to secure a covering layer, such as an artificial turf layer, to the top flexible border of the upstanding edge portion of the border. The flange portion may extend substantially horizontally from a lower portion of the upstanding edge portion of the border and is configured to secure the flexible border to an underlying surface, such as the ground.

According to certain illustrative embodiments, the edge portion of the flexible border member is divided into a plurality of hollow edge blocks that are connected by a connecting member extending between adjacent blocks. The connecting members are configured to connect adjacent edge blocks together to create an elongated border member and to permit the elongated border member to bend or flex in response to a force applied to the border.

Each of the plurality of edge blocks may include a top surface, spaced-apart side walls depending downwardly from edges of the top surface, and an open bottom. A flange member extends from lower ends of at least one of the connected edge blocks. According to certain embodiments, a flange member extends from lower ends of each of the connected edge blocks. According to certain embodiments, a flange member extends substantially horizontally from lower ends of each of the connected edge blocks. A flange(s) extending from each of the edge blocks comprises at least one hole configured to receive a mechanical fastener for securing the flexible edge border to the underlying surface.

Also disclosed is a surfacing system and method for installing a surfacing system. According to certain illustrative embodiments, the surfacing system is an outdoor surfacing system. According to other illustrative embodiments, the surfacing system is an indoor surfacing system. According to certain embodiments, the outdoor surfacing system comprises an artificial turf surface that is a replacement for natural grass surface. The artificial turf surface system may be installed in stadiums, on golf courses, playground areas, sports playing fields and residential lawns.

According to certain embodiments, the surface system includes a flexible border comprising an upstanding edge portion having opposite first and second ends, a top surface capable of being penetrated by a mechanical fastener to secure a covering layer to the flexible border, and a flange portion extending substantially horizontally from the upstanding edge portion. The flange portion is configured to secure the flexible border to an underlying surface. A suitable infill material is located within an area defined by the flexible border. A covering layer is positioned over the infill material and secured to the upstanding edge portion of the flexible border. At least one fastener, such as a mechanical fastener, is utilized to secure the covering layer to the flexible border.

According to certain embodiments, the upstanding edge portion of the flexible border is comprised of a plurality of edge blocks that are connected by integral connector portions that extend between immediately adjacent edge blocks along the longitudinal axis of the upstanding edge portion. Each of the plurality of edge blocks includes a substantially horizontal a top surface, end walls, and side walls that depend downwardly from the top surface. The top surfaces of the edge blocks are capable of being penetrated by a mechanical fastener to secure a covering layer to the edge blocks. Extending outwardly in a horizontal manner from each of the edge blocks that collectively comprise the upstanding edge portion of the flexible border is a flange portion. The flange portion has oppositely facing first and second major surfaces. Second major surface of the flange portion is configured to be placed on the surface of an underlying surface or substrate. The flexible border is secured to the underlying surface by driving a nail, pin, rod, through the flange portion and into the underlying ground. The flexible border defines a perimeter about an area. A suitable infill material is located within the area defined by the flexible border. A covering layer such as rolls of artificial turf are positioned over the layer of infill material and secured to the top surfaces of the edge blocks of the upstanding edge portion of the flexible border with mechanical fasteners.

According to certain illustrative embodiments, provided is surfacing system, such as an artificial turf system. The surfacing system includes a base member, a covering layer covering said base and a flexible border surrounding the base member to establish an outer perimeter of the surfacing system.

According to certain illustrative embodiments, the base member comprises a plurality of separate connectable tile members and are connected or otherwise interlocked to form a larger base or grid structure. According to certain illustrative embodiments, each of the separate tile members constituting the base member have upstanding side walls projecting upwardly from the bottom of the tile member. According to certain embodiments, the plurality tile members may be further divided into a number of compartments that are separated by common walls, and that are adapted or configured to accept and contain an infill material. There is no limitation as to the outer geometry of the compartments of each tile member, or the tile members themselves. According to certain embodiments, by way of example, the compartments may be substantially circular, substantially square, substantially oval, or substantially triangular in shape when viewed in cross section. According to certain embodiments, tile members may comprise alternating substantially square compartments and substantially circular compartments.

Each of the plurality of tile members comprise upstanding side walls defining a tile member perimeter. At least one of the upstanding side walls of the tile members includes a protrusion that is configured to interlock with a mating portion of an adjacent tile member. According to certain embodiments, at least two upstanding walls of tile members may include a protrusion that is configured to interlock with a mating portion of an adjacent tile member. For embodiments where two upstanding walls carry protrusions for interlocking with adjacent tiles, the two upstanding walls of the tile member may be adjacent and substantially perpendicular to one another.

The flexible border of the surfacing system comprises an upstanding edge portion having opposite first and second ends. The border includes a surface capable of being penetrated by a mechanical fastener to secure covering layer to the flexible border. The first opposite end of the flexible border member may include a female mating portion configured to interlock with an adjacent flexible border member. The second opposite end of the flexible border member may include a protrusion configured to interlock with the female mating portion of an adjacent border member. Thus, a plurality of flexible border members may be interconnected in an end-to-end relationship to form a longer border member. The surface of the border to which the covering layer is secured is a substantially horizontal surface in relation to the underlying ground or surface to which the surfacing system is installed. The surfacing system includes a plurality of fasteners securing the covering layer to the upstanding edge portion of the flexible border.

According to certain embodiments, the upstanding edge portion of the flexible border includes a top surface having a set of spaced-apart long edges and a set of spaced-apart short edges, spaced-apart side walls depending downwardly from long and short edges of the top surface of the edge portion and an open bottom. According to certain embodiments, the top surface together with the downwardly depending side walls define an upstanding edge member having a downwardly facing open cavity.

According to certain embodiments, the edge portion of the flexible border member is divided into a plurality of hollow edge blocks. Each of the edge blocks defining the upstanding edge portion of the flexible border includes a top surface having a set of spaced-apart long edges and a set of spaced-apart short edges, spaced-apart side walls depending downwardly from long and short edges of the top surface of the edge portion and an open bottom. The adjacent edge blocks adjacent edge blocks are connected by a connecting member that is configured to permit the upstanding edge blocks of the border member to flex.

The flexible border further includes a flange member extending substantially horizontally from a lower end of the upstanding edge portion of the flexible border. The horizontally extending flange member is configured to secure the flexible border to an underlying surface such as the ground. The flange members may be provided in a triangular shape with the base of the triangle adjacent the lower end of the edge block. According to certain embodiments, the flange extending from each of the edge blocks includes at least one hole that is configured to receive a mechanical fastener for securing the flexible edge border to the underlying surface. The flexible border member comprises a second connector member extending between the terminal tips of adjacent flange members. The fastener may include a pin, rod, or spike member for passing through the holes of the flange and driving into the ground.

There is no limitation as to the top covering layer, and any covering layer that may be used in an indoor or outdoor surfacing system may be used. According to certain embodiments, the covering layer is selected from artificial turf, natural turf, carpet, laminate flooring, or combinations thereof.

The surfacing system further comprises an infill material that is introduced and contained in the base member of the system. Without limitation, the infill material may be selected dirt, gravel, rock, pebble, stone, sand, clay, or any combinations thereof.

The surfacing system is generally applied over an existing surface such as the ground. The area to which the surfacing system is to be installed is generally prepared to accept the installation of the system. Preparation of the area may include digging and removing Earth from an area, grading the area, backfilling the area with a suitable backfill material, and tamping or otherwise leveling the area. The flexible border is secured to the underlying prepared surface by passing a fastener through said flange portion of the flexible border and driving it into the underlying surface. A suitable length of the flexible border is secured to the ground to define the perimeter of the surfacing system. A base member is created within the perimeter of the surface system defined by the flexible border by positioning a plurality of tile members within the perimeter and interconnecting them to form a larger base or grid member. Once the base member has been formed, a suitable infill material is used to infill at least a portion of the base member. The covering layer is applied over the infilled base member and flexible border. The covering layer is secured to the top surface of the edge member of the border member with a suitable fastener. Suitable fasteners include, without limitation, nails, rivets, screws, staples, tacks and the like.

According to certain illustrative embodiments, a border member is laid to define a border, with border members being both connectable to other border members and severable in order to define the border of a given length, with a mechanical fastener being placed through at least one of the holes of the border member to secure it in place. According to certain embodiments, a tile member is then placed on top and adjacent to the border member, followed by the addition of a backfill material to the tile member. According to certain embodiments, the top layer is then placed on top of the border member and tile member.

According to certain embodiments, the tile members are connectable to one other. According to certain embodiments, the tile member may include at least one side surface, wherein the side surface includes protrusions that may be configured to interlock with a corresponding member on another tile. The corresponding member on another tile member may be an inlet, another protrusion, or a mechanical fastener. According to certain embodiments, the tile members may include at least two side surfaces, wherein the side surfaces include protrusions that may be configured to interlock with a corresponding member on another tile. According to certain embodiments, the tile member may include at least one side surface, wherein the side surface includes at least one inlet configured to interlock with a protrusion from another tile member. According to certain embodiments, the tile member may include at least two side surfaces, wherein the side surfaces each include at least one inlet, wherein the inlet is configured to interlock with a protrusion from another tile member.

According to certain embodiments, the border member comprises a front and back, with the ends of the flat flange pieces extending from the edge blocks defining a front and the edge blocks defining a back, wherein the blocks are connected by a first connector extending between immediately adjacent blocks and the front is connected by a continuous or discontinuous second connector. According to certain embodiments, for any given border member, the ends of a border member are flexible toward the front, but substantially inflexible toward the back, when the second connector is not severed. According to certain embodiments, for any given border member, the ends of a border member are flexible either toward the front or back when the second connector is severed. This enables the border member to be durable and straight when desired, and bend around curves or other surface irregularities when circumstances require, such as going around a tree or a curb. The flexible border maybe manufactured from a polymeric, plastic or flexible composite material.

FIG. 1 is a perspective view of the border of the present embodiments. The border member 10 includes a back 14, made up in part of edge blocks 12, including end blocks 24. Shown is the protrusion 20 from an end block 24, configured to interlock with another border member 10. Flat flanges 18 including holes 22 extend from the edge blocks 12 to form a front portion. The front is connected by a continuous second connector 16.

Figure 2:
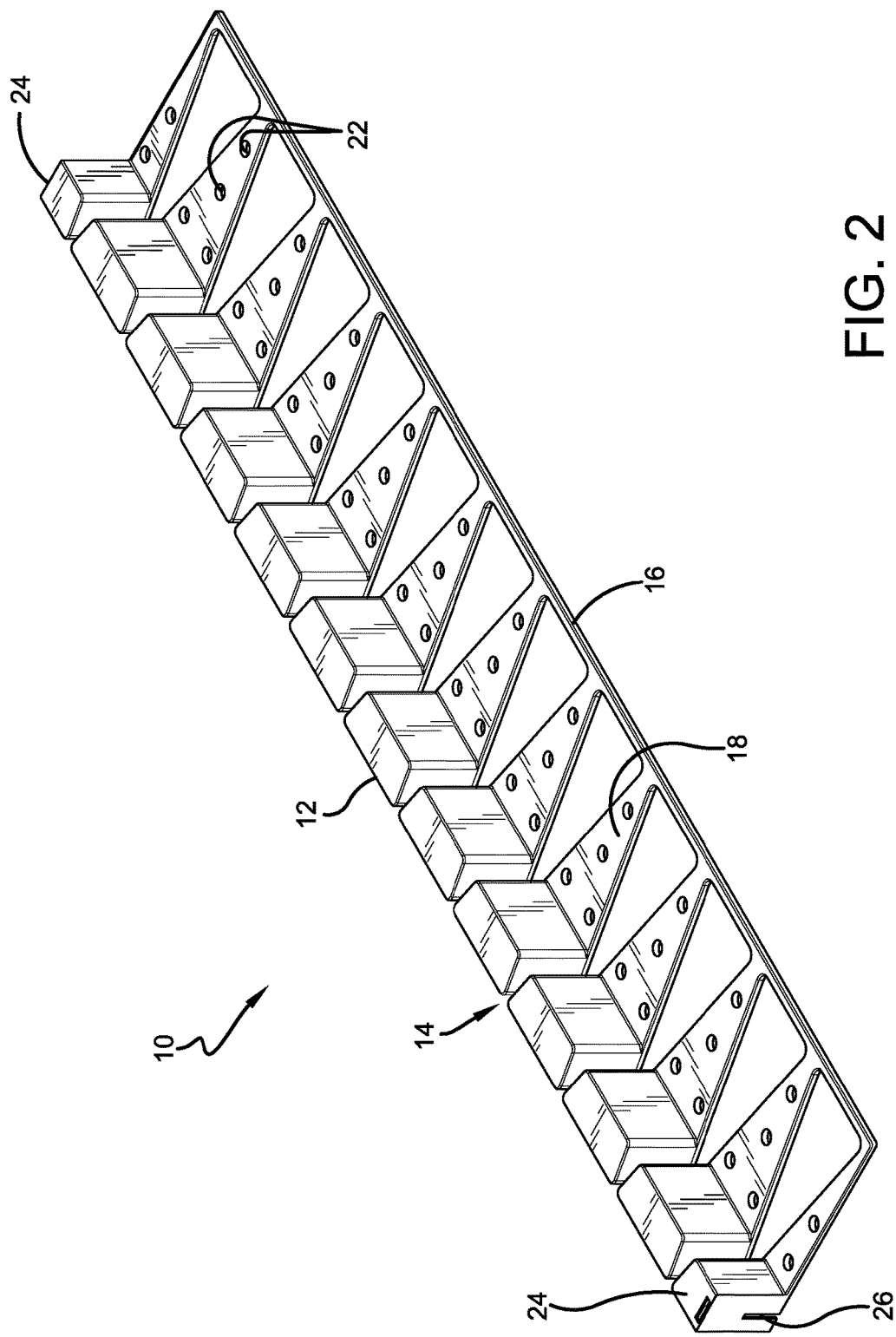
FIG. 2 is a perspective view of the border of the present embodiments.

FIG. 2 is a perspective view of the border of the present embodiments. The border member 10 includes a back 14, made up in part of edge blocks 12, including end blocks 24. Shown is the inlet 26 to an end block 24, configured to interlock with another border member 10. Flat flange 18 including holes 22 extend from the edge blocks 12 to form a front. The front is connected by a continuous second connector 16.

FIG. 3 is a top view of the border of the present embodiments. The border member 10 includes a back 14, made up in part of edge blocks 12, including end blocks 24. Shown is both the inlet 26 and protrusion 20, enabling the border member 10 to interlock with multiple border members 10. Flat flanges 18 including holes 22 extend from the edge blocks 12 to form a front, wherein the front is connected by a continuous connector 16. Also shown are means for providing friction 28, in FIG. 3, without limitation, bumps 28.

FIG. 4 is a bottom view of the border of the present embodiments. The border member 10 includes a back 14, made up in part of edge blocks 12, including end blocks 24. Shown is both the inlet 26 and protrusion 20, enabling the border member 10 to interlock with multiple border members 10. Flat flanges 18 including holes 22 extend from the edge blocks 12 to form a front, wherein the front is connected by a continuous connector 16. Also shown are means for subdividing the edge blocks 30, which provides further support for the border member 10 while leaving the edge block 12 substantially hollow, making it better configured to receive a mechanical fastener to secure the covering layer to border.

FIG. 5 is a front view of the border of the present embodiments. The border member 10 includes a back 14, made up in part of edge blocks 12, including end blocks 24. Shown is the protrusion 20 from an end block 24, enabling the border member 10 to interlock with multiple border members 10. Flat flanges 18 extend from the edge blocks 12 to form a front. The front is connected by a continuous connector 16.

FIG. 6 is a back view of the border of the present embodiments. The border member 10 includes a back 14, made up in part of edge blocks 12, including end blocks 24. Shown is the protrusion 20 from an end block 24, enabling the border member 10 to interlock with multiple border members 10.

FIG. 7 is a right side view of the border of the present embodiments. The border member 10 includes an end block including a protrusion 20, enabling the border member 10 to interlock with another border member 10. Also shown is a flat piece 18 extending from the end block 24, wherein the flat piece 18 extends to a front piece 16.

FIG. 8 is a left side view of the border of the present embodiments. The border member 10 includes an end block including an inlet 26, enabling the border member 10 to interlock with another border member 10. Also shown is a flat flange 18 extending from the end block 24, wherein the flat piece 18 extends to a connector 16.

Figure 9:
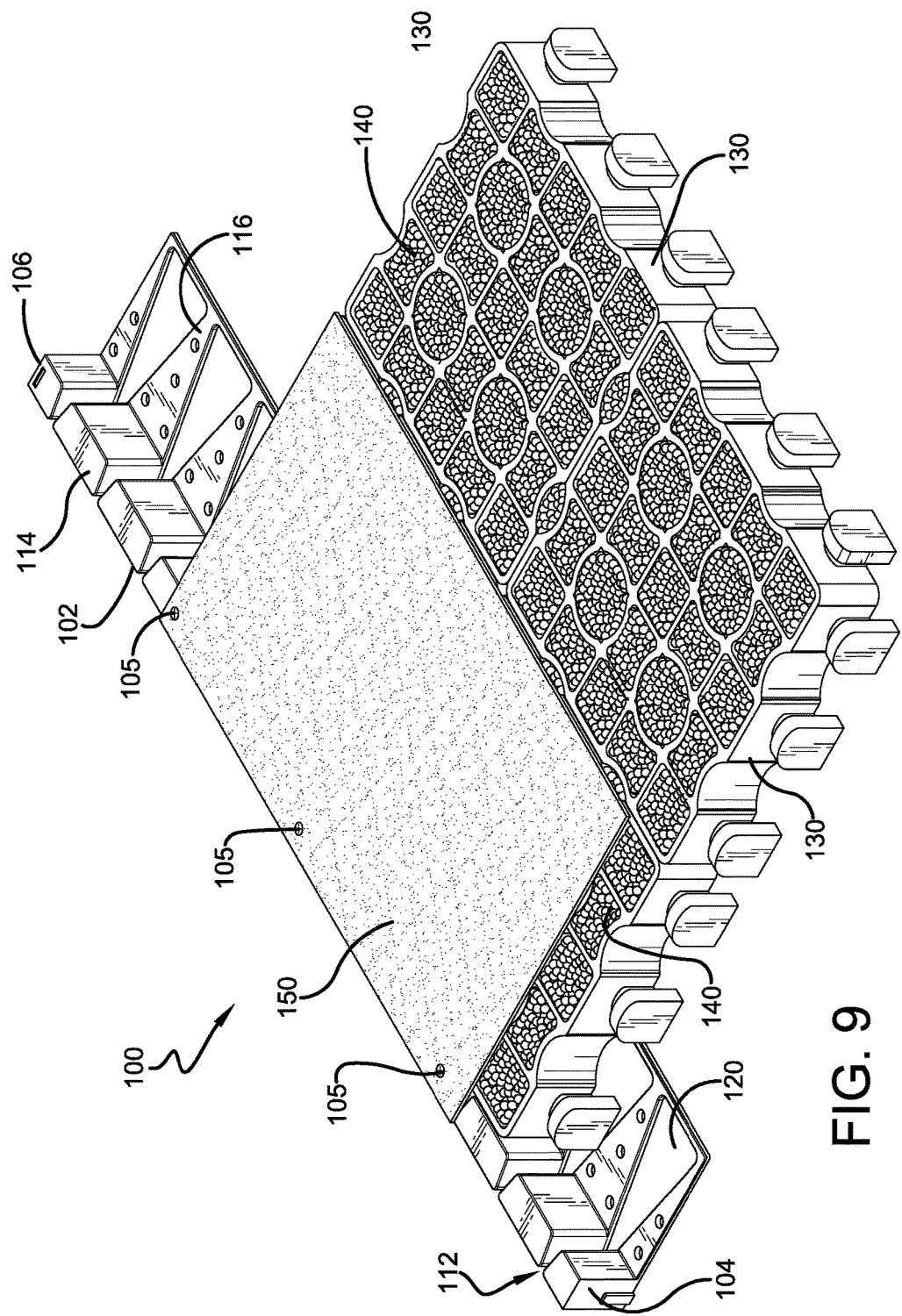
FIG. 9 is a top perspective view of an illustrative embodiment of the surface system.

FIG. 9 is a top perspective view of an illustrative embodiment of the surface system 100. Surface system includes a flexible border 102 that comprises an upstanding edge portion 104 having opposite first 106 and second ends 108. Edge portion 104 is includes a plurality of edge blocks 110 that are connected by integral connector portions 112. Each of the plurality of edge blocks 110 includes a substantially horizontal a top surface 114 that is capable of being penetrated by a mechanical fastener to secure a covering layer to the flexible border 102. Flexible border 102 further includes flange portion 116 extending substantially horizontally from the lower end of the upstanding edge portion 104. The flange portion 116 is configured to secure the flexible border 102 to an underlying surface 120. A base or grid 130 comprising a plurality of interconnected tile members 132 is placed on the underlying surface 120 within the area defined by the flexible border 102. A suitable infill material 140 is located within an area defined by the flexible border 102. A covering layer 150 is positioned over the layer of infill material 140 and secured to the top surfaces 114 of the edge blocks 110 of the upstanding edge portion 104 of the flexible border 102 with mechanical fasteners 105.

According to certain embodiments, the method of installing a surfacing system comprises securing a flexible border to an underlying surface. The flexible border comprises an upstanding edge portion having opposite first and second ends, a surface capable of being penetrated by a mechanical fastener to secure a top covering layer to the flexible border, and a flange portion extending substantially horizontally from the edge portion and configured to secure the flexible border to an underlying surface. The method includes the step of passing a fastener through the flange portion of the flexible border and into the underlying surface. The secured flexible border defines a perimeter of the surfacing system. A base member is positioned within the perimeter of the surfacing system. The base member is infilled with a suitable infill material. The top covering layer is applied over the infilled base member and the top covering layer is secured to the edge portion of the flexible border member.

According to the above embodiment of the installation method, the base comprises a plurality of connectable tile members.

According to any one of the above embodiments of the installation method, the each of said plurality of connected tile members are divided into adjacent compartments for containing an infill material.

According to any one of the above embodiments of the installation method, said compartments comprise alternating substantially square compartments and substantially circular compartments.

According to any one of the above embodiments of the installation method, each of said plurality of tile members comprise upstanding side walls defining a tile member perimeter, and wherein at least one of said upstanding side walls includes a protrusion configured to interlock with an adjacent tile member.

According to any one of the above embodiments of the installation method, at least two upstanding walls of each of said plurality of tile members includes a protrusion configured to interlock with an adjacent tile member.

According to any one of the above embodiments of the installation method, said two upstanding walls are adjacent and substantially perpendicular to one another.

According to any one of the above embodiments of the installation method, said edge portion of said flexible border comprises a top surface, spaced-apart side walls depending downwardly from opposite lateral edges of said top surface, and an open bottom.

According to any one of the above embodiments of the installation method, said edge portion of said flexible border member is divided into a plurality of hollow edge blocks, wherein adjacent edge blocks are connected by a connecting member configured to permit said border member to flex.

According to any one of the above embodiments of the installation method, wherein each of said plurality of edge blocks comprising a top surface, spaced-apart side walls depending downwardly edges of said top surface, and an open bottom.

According to any one of the above embodiments of the installation method, wherein said flexible border where said flange member extends from lower ends of said each of said connected edge blocks.

According to any one of the above embodiments of the installation method, wherein said flange extends from each of said edge blocks comprises at least one hole configured to receive a mechanical fastener for securing said flexible edge border to said underlying surface.

According to any one of the above embodiments of the installation method, wherein said first opposite end of said flexible border member includes an inlet configured to interlock with an adjacent flexible border member.

According to any one of the above embodiments of the installation method, said second opposite end of said flexible border member includes a protrusion configured to interlock with said inlet of an adjacent border member.

According to any one of the above embodiments of the installation method, said flexible border member comprises a second connector member extending between adjacent flange members.

According to any one of the above embodiments of the installation method, said top covering layer is selected from the group of artificial turf, natural turf, carpet, laminate flooring, or combinations thereof.

According to any one of the above embodiments of the installation method, further comprising infilling at least a portion of the base member with a suitable infill material.

According to any one of the above embodiments of the installation method, said infill may be selected form the group consisting of dirt, gravel, rock, pebble, stone, sand, clay, or combinations thereof.

According to any one of the above embodiments of the installation method, further comprising at least one fastener securing said top covering layer to said edge portion of said flexible border.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

The invention claimed is:

1. A surface system comprising:
 a flexible border comprising an upstanding edge portion having opposite first and second ends, a top surface capable of being penetrated by a mechanical fastener to secure a covering layer to said flexible border, wherein said edge portion of said flexible border comprises a top surface, spaced-apart side walls depending downwardly from opposite lateral edges of said top surface, and an open bottom, wherein said upstanding edge portion of said flexible border is divided into a plurality of hollow edge blocks, wherein adjacent hollow edge blocks are connected by a connecting member configured to permit said border to flex, and a flange portion extending substantially horizontally from said upstanding edge portion and configured to secure the flexible border to an underlying surface;
 a covering layer; and
 at least one fastener securing said covering layer to said flexible border.

2. The surface system of claim 1, further comprising a base member supporting said covering layer.

3. The surface system of claim 2, wherein said base member comprises a plurality of connectable tile members.

4. The surface system of claim 3, wherein each of said plurality of connected tile members are divided into adjacent compartments for containing an infill material.

5. The surface system of claim 4, wherein said compartments comprises alternating substantially square compartments and substantially circular compartments.

6. The surface system of claim 5, wherein each of said plurality of tile members comprise upstanding side walls defining a tile member perimeter, and wherein at least one of said upstanding side walls includes a protrusion configured to interlock with an adjacent tile member.

7. The surfacing system of claim 6, wherein at least two upstanding walls of each of said plurality of tile members includes a protrusion configured to interlock with an adjacent tile member.

8. The surfacing system of claim 7, wherein said two upstanding walls are adjacent and substantially perpendicular to one another.

9. The surfacing system of claim 2, further comprising an infill located in said base.

10. The surfacing system of claim 9, wherein said infill may be selected form the group consisting of dirt, gravel, rock, pebble, stone, sand, clay, or combinations thereof.

11. The surfacing system of claim 10, further comprising at least one fastener securing said top covering layer to said edge portion of said flexible border.

12. The surfacing system of claim 1, wherein each of said plurality of edge blocks comprising a top surface, spaced-apart side walls depending downwardly edges of said top surface, and an open bottom.

13. The surfacing system of claim 12, wherein said flexible border where said flange member extends from lower ends of said each of said connected edge blocks.

14. The surfacing system of claim 13, wherein said flange extending from each of said edge blocks comprises at least one hole configured to receive a mechanical fastener for securing said flexible edge border to said underlying surface.

15. The surfacing system of claim 14, wherein said first opposite end of said flexible border member includes an inlet configured to interlock with an adjacent flexible border member.

16. The surfacing system of claim 15, wherein said second opposite end of said flexible border member includes a protrusion configured to interlock with said inlet of an adjacent border member.

17. The surfacing system of claim 16, wherein said flexible border member comprises a second connector member extending between adjacent flange members.

18. The surfacing system of claim 1, wherein said top covering layer is selected from the group of artificial turf, natural turf, carpet, laminate flooring, or combinations thereof.

19. A method of installing a surfacing system comprising:
securing a flexible border to an underlying surface, said flexible border comprising an upstanding edge portion having opposite first and second ends, a surface capable of being penetrated by a mechanical fastener to secure a top covering layer to said flexible border, wherein said edge portion of said flexible border comprises a top surface, spaced-apart side walls depending downwardly from opposite lateral edges of said top surface, and an open bottom, wherein said upstanding edge portion of said flexible border is divided into a plurality of hollow edge blocks, wherein adjacent hollow edge blocks are connected by a connecting member configured to permit said border to flex, and a flange portion extending substantially horizontally from said edge portion and configured to secure the flexible border to an underlying surface, by passing a fastener through said flange portion of said flexible border and into said underlying surface, said secured flexible border defining a perimeter of said surfacing system;
positioning a base member within said perimeter of said surfacing system;
infilling said base member with a suitable infill material; and
applying a top covering layer over said infilled base member and securing said top covering layer to said edge portion of said flexible border member.

* * * * *